US012798720B2

(12) United States Patent
Weigel

(10) Patent No.: US 12,798,720 B2
(45) Date of Patent: Nov. 17, 2026

(54) DRIVE UNIT FOR AN ELECTRIC BICYCLE, COMPRISING TWO SIGNAL TRANSMITTERS TAKING INTO ACCOUNT ELASTIC DEFORMATION, AND CONTROL METHOD

(71) Applicant: Brose Antriebstechnik GmbH & Co. Kommanditgesellschaft, Berlin, Berlin (DE)

(72) Inventor: Christfried Weigel, Berlin (DE)

(73) Assignee: BROSE ANTRIEBSTECHNIK GMBH & CO. KOMMANDITGESELLSCHAFT, BERLIN, Berlin (DE)

( * ) Notice: Subject to any disclaimer, the term of this patent is extended or adjusted under 35 U.S.C. 154(b) by 317 days.

(21) Appl. No.: 18/729,760

(22) PCT Filed: Jan. 17, 2023

(86) PCT No.: PCT/EP2023/050987
§ 371 (c)(1),
(2) Date: Oct. 11, 2024

(87) PCT Pub. No.: WO2023/139055
PCT Pub. Date: Jul. 27, 2023

(65) Prior Publication Data

US 2025/0153802 A1 May 15, 2025

(30) Foreign Application Priority Data

Jan. 20, 2022 (DE) ..................... 10 2022 101 317.0

(51) Int. Cl.
*B62M 6/50* (2010.01)
*B62J 45/411* (2020.01)

(52) U.S. Cl.
CPC .............. *B62M 6/50* (2013.01); *B62J 45/411* (2020.02)

(58) Field of Classification Search
CPC . B62M 6/50; B62M 6/55; B62J 45/411; B62J 45/421
See application file for complete search history.

(56) References Cited

U.S. PATENT DOCUMENTS

| | | | | |
|---|---|---|---|---|
| 4,453,420 | A | 6/1984 | Nakane et al. | |
| 10,955,302 | B2 * | 3/2021 | Appleton | G01L 3/109 |
| 2025/0388288 | A1 * | 12/2025 | Manewald | B62M 6/45 |

FOREIGN PATENT DOCUMENTS

| | | | | |
|---|---|---|---|---|
| CN | 114364604 A | * 4/2022 | | F16H 3/093 |
| CN | 119773904 A | * 4/2025 | | B62J 6/01 |

(Continued)

*Primary Examiner* — Drew J Brown
(74) *Attorney, Agent, or Firm* — HEA Law PLLC

(57) ABSTRACT

It is provided a drive unit for an electric bicycle, comprising an output element for providing a torque for driving the electric bicycle, a drive shaft for generating a first drive torque by a rider of the electric bicycle by means of muscle force, an electric motor for the generation by external force of a second drive torque at a rotor shaft coupled to the electric motor, and a transmission device for transmitting the second drive torque to the output element. The output element is connected in a rotationally fixed manner to the drive shaft. Furthermore, the drive unit has at least two signal transmitters, which are spaced apart from one another spatially, on a drive assembly which comprises the output element.

20 Claims, 4 Drawing Sheets

(56) References Cited

FOREIGN PATENT DOCUMENTS

| | | | | | |
|---|---|---|---|---|---|
| DE | 3213589 | A1 | | 11/1982 | |
| DE | 19853734 | A1 | | 5/2000 | |
| DE | 102010048592 | A1 | | 4/2012 | |
| DE | 202014103470 | U1 | | 12/2015 | |
| DE | 102016123095 | A1 | | 5/2018 | |
| DE | 102018217351 | A1 | | 4/2020 | |
| DE | 102019200530 | A1 | * | 7/2020 | ............. G01L 3/104 |
| DE | 102021103074 | B3 | | 3/2022 | |
| DE | 102021208977 | A1 | | 6/2022 | |
| DE | 102022109482 | A1 | * | 10/2022 | ............. G01L 3/102 |
| DE | 102021210230 | A1 | * | 3/2023 | .............. B62M 6/50 |
| DE | 102022135065 | A1 | * | 7/2024 | .............. F16C 33/64 |
| DE | 102024204553 | A1 | * | 11/2024 | ........... G01L 5/0019 |
| DE | 102023208381 | A1 | * | 3/2025 | ............ B62M 3/003 |
| EP | 3012181 | A1 | | 4/2016 | |
| EP | 4354109 | A2 | * | 4/2024 | .............. B62M 6/55 |
| IT | 202100028133 | A1 | * | 5/2023 | .............. B62M 6/55 |
| JP | 2010038801 | A | | 2/2010 | |
| JP | 2010066043 | A | | 3/2010 | |
| JP | 2012020692 | A | | 2/2012 | |
| WO | 2020074155 | A1 | | 4/2020 | |
| WO | WO-2022233779 | A1 | * | 11/2022 | .............. B62M 6/55 |

* cited by examiner

DRIVE UNIT FOR AN ELECTRIC BICYCLE, COMPRISING TWO SIGNAL TRANSMITTERS TAKING INTO ACCOUNT ELASTIC DEFORMATION, AND CONTROL METHOD

CROSS REFERENCE TO RELATED APPLICATIONS

The present application is a U.S. National Phase of International Application No. PCT/EP2023/050987 entitled "DRIVE UNIT FOR AN ELECTRIC BICYCLE, COMPRISING TWO SIGNAL TRANSMITTERS TAKING INTO ACCOUNT ELASTIC DEFORMATION, AND CONTROL METHOD," and filed on Jan. 17, 2023. International Application No. PCT/EP2023/050987 claims priority to German Patent Application No. 10 2022 101 317.0 filed on Jan. 20, 2022. The entire contents of each of the above-listed applications are hereby incorporated by reference for all purposes.

BACKGROUND

The proposed solution relates to a drive unit for an electric bicycle, and to a control method for a drive unit of this kind.

It is known to use at least one electric motor in combination with a transmission device, e.g., comprising a planetary gear stage, on an electric bicycle, and therefore on what is known as an e-bike or pedelec, in order to provide motorized assistance when riding the electric bicycle. In this case, a corresponding drive unit comprises a drive shaft (typically also referred to as a bottom bracket shaft), via which a drive torque generated by a rider of the electric bicycle can be introduced, and on which pedals are provided for this purpose. In addition to a first drive torque introduced at the drive shaft by means of muscle force, a second drive torque can be provided by external force, e.g., with the aid of an electric motor. The at least one electric motor and the output shaft are coupled together via the transmission device of the drive unit, such that a torque can be transmitted to a wheel, typically a back wheel of the electric bicycle, via an output shaft of the drive unit that is to be coupled to a wheel of the electric bicycle, which torque stems from the first and second drive torque.

Routinely, in the case of such drive units, the drive shaft and the output shaft are arranged coaxially with respect to one another. For this purpose, the output shaft is then configured for example as a hollow shaft. However, the output shaft is then comparatively heavy, and the structure of the drive unit is comparatively complex. Furthermore, a combined overall torque, i.e., resulting from the sum of the drive torques applied by means of muscle force and by external force, cannot be readily acquired by sensors, for example on account of a different force input at the left-hand and right-hand ends of the drive shaft, on which the pedals are provided. However, this is accepted for an allegedly more compact structure of the drive unit.

SUMMARY

However, in the case of drive units for electric bicycles, in particular drive units for what are known as mid-mounted motors, this still requires improved or alternative drive units, for example drive units in which weight or costs can be saved.

Against this background, the drive unit having features as described herein and the control method of having features as descried herein are proposed.

In this case, a proposed drive unit for an electric bicycle comprises at least the following:

- an output element for providing a torque for driving the electric bicycle,
- a drive shaft for generating a first drive torque by a rider of the electric bicycle by means of muscle force,
- an electric motor for the generation by external force of a second drive torque at a rotor shaft coupled to the electric motor, and
- a transmission device for transmitting the second drive torque to the output element.

According to the proposed solution, the output element is connected to the drive shaft in a rotationally fixed manner. Furthermore, the drive unit comprises at least two signal transmitters, which are spaced apart from one another spatially, on a drive assembly which comprises the output element and the drive shaft, via which, during operation of the drive unit, two temporally successive measurement signals can be generated, the time interval of which varies depending on the level of the first and second drive torques.

The proposed solution thus proceeds from the basic concept of providing two signal transmitters on a drive assembly of a drive unit for an electric bicycle, in which the output element and the drive shaft are connected to one another in a rotationally fixed manner, such that the first and second drive torques (and thus what is referred to as a rider torque and a motor torque) are added on the output element, and at least two signal transmitters are to be provided within a drive assembly of this kind, for generating measurement signals, in such a way that the measurement signals generated by the signal transmitters correlate in their time interval with the levels of the first and second drive torques or conclusions can be drawn about the levels of the first and second drive torques (in absolute or relative terms with respect to one another) from the differences in the time intervals between the measurement signals. The time interval of the measurement signals of the at least two signal transmitters, which are spaced apart from one another spatially, thus varies depending on the levels of the first and second drive torques. Depending on the level of the first and second drive torques relative to one another, in absolute or relative terms, a different measurable time interval of successive measuring signals consequently results.

Thus, based on the axis of rotation about which the drive shaft and the output element that is connected thereto in a rotationally fixed manner, for example fixed thereto in a rotationally fixed manner or formed integrally therewith, a change in a phase shift between the two measurement signals provided with the aid of the signal transmitters can be evaluated. In this way, it is possible to electronically conclude a current level of an (overall) torque for driving the electric bicycle and/or a current level of the first drive torque/rider torque (in absolute or relative terms), and thereby optionally determine a control variable by means of which an assistance power to be provided by the electric motor is predetermined. In this way it is possible to calculate, from the evaluated phase shift between the measurement signals, for example when the second drive torque/motor torque is known, the level of the first drive torque/rider torque applied by means of muscle force. On this basis, a control variable can then be determined, in order to adjust the assistance power of the electric motor—for example depending on an assistance stage set by the user.

In a variant, the at least two signal transmitters are arranged such that a change of the time interval between the measurement signals generated by the signal transmitters is representative of an elastic deformation at the drive assembly on account of the generated first and second drive torques. The drive assembly comprising the signal transmitters provided thereon is consequently configured such that an elastic deformation at the components of the drive assembly is allowed and evaluated in a targeted manner, when first and second drive torques generated by means of muscle force and by external force are applied, during operation of the drive unit, for driving the electric bicycle. The magnitude of the elastic deformation, and thus a spatial distance between the two signal transmitters, varies depending on the level of the first drive torque and of the second drive torque. This variation of the spatial distance in turn leads to a measurable and evaluable variation of the time interval with which the measurement signals generated via the signal transmitter are acquired.

In principle, it can be provided that a first signal transmitter of the at least two signal transmitters is provided at a first point a) on the drive shaft or b) at a region of the output element that is assigned to the drive shaft, and a second signal transmitter of the at least two signal transmitters is provided at a second point a) at a region of the output element assigned to the transmission device or b) at a region of the output element that is assigned to an output wheel of the output element.

Consequently, the first signal transmitter is provided here on a portion of the drive shaft or a portion of the output element close to the drive shaft, while the second signal transmitter, spaced apart therefrom, is provided further away from the drive shaft, on the output element, and therefore on a region of the output element on which the second drive torque generated via the electric motor is applied or is conducted further in the direction of the output. The second point, at which the second signal transmitter is provided, can in principle be located radially further outside, based on an axis of rotation of the drive shaft, compared with the first point at which the first signal transmitter is provided.

Depending on the (attachment) point at which one signal transmitter is provided, in particular in relation to the other signal transmitter, different levels of changes in the time intervals between the signals can be identified, since different levels of elastic deformations can occur within the drive assembly, between the respective portions, during operation of the drive unit. Thus, for example, depending on the position of the at least two signal transmitters within the drive assembly, phase shifts of (in absolute terms) at least 2° to 4°, in particular in the range of 3° to 5°, can be observed or purposely allowed by the configuration of the drive assembly and setting of a particular torsional stiffness. This includes phase shifts in the range of −5° to +5°. In this case, negative phase shifts can occur for example in the course of recuperation or reverse travel with the electric bicycle. In particular in the case of an electric bicycle configured as what is known as a cargo bike, reverse travel assisted or driven by an electric motor is not atypical.

For driving the electric bicycle with an (overall) torque resulting from the first and second drive torques, an output wheel of the output element can in principle be connected to a force transmission member which is provided for transmitting the torque to a back wheel of the electric bicycle. A force transmission member of this kind can for example be a chain or a belt. An output wheel for a chain then for example comprises teeth, which engage in the chain. The output wheel can consequently in particular be an output gear wheel or an output pulley.

In a variant, the drive unit comprises at least one Hall sensor for generating the first and/or second measuring signal. In such a case, a signal transmitter can consequently be formed by a Hall sensor on the drive assembly or by a magnet element which interacts with at least one stationary Hall sensor of the drive assembly upon rotation of the drive shaft and of the output element, in order to generate a measuring signal when passing the Hall sensor. In principle, the proposed solution makes it possible to conclude the level of the drive torque, in particular, in a variant, the level of a first drive torque/rider torque applied by means of muscle force, on the basis of signal transmitters of comparatively simple design, and measuring signals generated thereby. The use of a torque sensor on the drive assembly is therefore not necessary, for example. This then consequently allows, however, a corresponding measurement with comparatively low costs and in addition in minimal installation space. When cost-effective and comparatively small Hall sensors are used, these cost advantages can increase further.

In a variant, the drive unit comprises an electronic control unit which is configured to determine a control variable representative of the level of the first drive torque, using the first and second measurement signals and using a signal representative of the second drive torque. The signal representative of the second drive torque can for example be a measurement signal or motor signal of the electric motor, since the second drive torque is applied by the electric motor. Thus, when the second drive torque/motor torque is known, the level of the first drive torque, and thus a control variable, via which control of the electric motor and thus possible adjustment of the level of the second drive torque to be generated is possible, can be concluded in a particularly simple manner from a time interval of the first and second measurement signals. Thus, a user of the electric bicycle should for example be provided precisely an assistance power for driving the electric bicycle which depends on the rider's power applied by means of muscle force. Consequently, in this variant, the electronic control unit is configured to calculate a control variable that is representative of the level of the first drive torque. In this case, the control variable can be a value that is to be processed further for controlling the electric motor, or a control signal that can be used directly for controlling the electric motor.

For example, in this connection the electronic control unit is configured to use at least one stiffness value that is representative of the torsional stiffness of the drive assembly, the drive shaft and/or the output element, and is stored in a memory, for determining the control variable. Thus, a corresponding stiffness value can in particular be stored in a memory of the control unit. The stored stiffness value is then consequently a stiffness constant which is representative of the respective torsional stiffness. In particular, a stiffness constant of this kind may have been determined and stored after performing a calibration process for the drive unit. In the case of a known torsional stiffness of the or at least within the drive assembly, a deformation-related change in a spatial distance between the second signal transmitters, and thus the level of the applied drive torques, with which the deformation is associated, can be concluded on the basis of a change in a phase shift between the measurement signals of the at least two signal transmitters.

In a variant, the output element comprises at least one spring element which specifies an elastic deformability of the output element in at least one portion of the output element at which one of the signal transmitters is provided.

Thus, an elasticity of a predefined magnitude is introduced into the output element in a targeted manner via the at least one spring element, for example in order to allow a particular deformability at a portion of the output element to a specific extent. In this case, the at least one spring element can correspondingly resiliently interconnect two portions of the output element. Alternatively, the at least one spring element can also be integrated, in particular injected, into the material of the output element.

Thus a spatial position change with respect to the other signal transmitter, during operation of the drive unit, is permitted in a targeted manner via the at least one portion of the output element which is elastically deformable counter to a restoring force of the at least one spring element and on which one of the signal transmitters is provided, and specifically to an extent such that a significant, measurable change in the temporal sequence of the measuring signals is also associated with a spatial position change, when the signal transmitters, rotating with the drive assembly, are moved past at least one stationary sensor part (such as a Hall sensor) of the drive unit.

In order to achieve a deformation path, predetermined by the at least one spring element, for an elastic deformation occurring during operation of the drive unit at an extend considered permissible—also for example in view of the prevention of a plastic, and thus irreversible, deformation—in a development the drive assembly can comprise block mechanics. Block mechanics of this kind can in particular be integrated on the output element itself. The block mechanics limits an elastic deformability, predetermined by the at least one spring element, of the at least one portion of the output element carrying the signal transmitter to a predefined maximum deformation path. In this way, it is possible to achieve the situation where a portion of the output element, on which one signal transmitter is provided (in the case of a restoring force acting thereon and applied by the at least one spring element), can deform only up to a maximum deformation path, and thus in particular relative to the other signal transmitter, during operation of the drive unit and first and second drive torque generated for the driving of the electric bicycle. Thus, for example a maximum deformation angle relative to the axis of rotation of the drive shaft can be predetermined via the block mechanics. From bridging the maximum deformation path, the block mechanics consequently blocks a further deformation of the portion, and thus mechanically limits the deformability of the portion carrying the one signal transmitter. In this case, the deformability of the portion carrying one of the signal transmitters is set for example in such a way that an elastic deformation occurs in a particular operating range of the drive unit, in that a rider of the electric bicycle pushes on a pedal, connected to the drive shaft, with a force below a threshold value, and thus generates a first drive torque, on the drive shaft, that is below a torque threshold value.

A torque threshold value of this kind is for example 30 Nm. In this case, the torque threshold value is selected for example such that the operating range corresponds to a typical normal journey of the electric bicycle at an average speed in the range of 5-25 km per hour. It is consequently provided, below the torque threshold value, that greater elastic deformability is inherent in the drive assembly, as a result of which the changes, electronically evaluable thereby, in the time intervals of the measurement signals can be comparatively large. Thus, in the range of a drive torque applied by means of muscle force of 0 to 30 Nm, there is a comparatively low torsional stiffness of the drive assembly, and the provided measuring system is comparatively sensitive. Thus, a finely stepped assistance power can be provided on the motor side, in the case of which for example the power applied by means of muscle force is increased by the factor 3 or 4. In turn, above the torque threshold value, a maximally possible assistance power is provided by the at least one motor. Thus, a further evaluation of the measurement signals is no longer essential.

In the case of a force that is above the torque threshold value, with which force the rider pushes the pedals of the electric bicycle, an atypical travel state or operating range is assumed, for example a sprint or a test ride. For this purpose, the assistance power of the electric motor can be regulated to a maximum value, and the torques evaluated via the signal transmitters do not necessarily have to control a finely stepped adjustment here. Accordingly, the block mechanism can be active here. Consequently, from the maximum deformation path, which is predetermined via the block mechanism, a travel state of the electric bicycle is assumed in which a rider of the electric bicycle pushes the pedals with a force that exceeds a (force) threshold value, and thus the electric motor is to be actuated for providing a particular, fixed assistance power.

The transmission device of the drive unit can in principle comprise at least one transmission wheel, in particular a transmission gear wheel or a transmission pulley, which can be driven via the rotor shaft, and which is provided for transmitting the second drive torque to the output element. In this case, the transmission wheel can also be connected to the output element in a rotationally fixed manner. This in particular includes the possibility that the output element, having a transmission wheel integrated thereon and an output wheel integrated thereon, is configured integrally with the drive shaft.

Consequently, in the case of a transmission gear wheel, the transmission device comprises at least one further gear wheel which meshes with the transmission gear wheel that is connected to the output element in a rotationally fixed manner, in order to transmit the second drive torque to the output element. In a variant comprising a transmission pulley (e.g., in the form of a belt pulley), the transmission device is configured having at least one belt element, for example in the form of a fan belt or cambelt, in order to transmit the second drive torque to the output element.

In principle, the transmission wheel can be formed on the output element itself, for example for the rotationally fixed connection to the output element. This consequently includes the situation where a portion that forms the transmission wheel is integrally connected to a carrier or web portion of the drive element. Alternatively, the transmission wheel formed on the output element can also be formed integrally with a carrier or web portion of the output element. In particular, in a variant, the transmission wheel can be formed integrally with an output wheel of the output element, which is provided for the transmission of the torque resulting from the first and second drive torques. Consequently, in a variant of this kind, on the output element a transmission wheel and an output wheel are components of the same part. This further reduces the complexity of the drive unit and furthermore also simplifies assembly of the drive unit. The output wheel can for example also be configured as an output gear wheel or as an output pulley.

In principle, the output element can comprise an output wheel which is connected to a force transmission member of the drive unit, for driving the electric bicycle. A force transmission member of this kind then establishes a coupling to a back wheel of the electric bicycle, such that a torque resulting from the first and second drive torques, for driving the electric bicycle, can be transmitted via the rotating output wheel from the output element to the back wheel of the electric bicycle.

In a variant, the output element is formed on the drive shaft itself. In this case, the output element is for example configured integrally with the drive shaft, such that the drive shaft and the output element are parts or portions of a single component. Alternatively, the output element can be fixed to the drive shaft in a rotationally fixed manner, such that the drive shaft and output element form an at least two-part drive assembly, in which the separately produced output element is fixed directly on the drive shaft in a rotationally fixed manner. In this case, both the variants explained above offer the advantage that no output shaft, to be mounted coaxially to the drive shaft, has to be provided, in particular no coaxially mounted hollow shaft.

The drive unit can in principle comprise a housing, in which the electric motor is received, and the drive shaft is rotatably mounted. In this case, the output element can be rotatably mounted on a housing opening of the housing. This in particular includes the situation where an output wheel of the drive element is rotatably mounted on the housing opening.

In this case, the direct rotatable mounting of an output wheel, connected to a transmission member, on the housing opening can also result in the drive unit making do entirely without an output shaft. Thus, here, the transmission wheel can then for example be formed integrally with the output wheel, wherein a circular cylindrical portion of the output wheel then assumes the rotatable mounting on the housing of the drive unit.

The proposed solution furthermore relates to an electric bicycle comprising a variant of a proposed drive unit.

A further aspect of the proposed solution relates to a control method for controlling at least one electric motor of the drive unit for an electric bicycle. In this case, a drive unit of an electric motor to be controlled in the context of the proposed control method comprises at least the following:

- a drive shaft for generating a first drive torque by a rider of the electric bicycle by means of muscle force,
- an output element, connected to the drive shaft in a rotationally fixed manner, for providing a torque for driving the electric bicycle,
- the at least one electric motor for the generation by external force of a second drive torque at a rotor shaft coupled to the electric motor,
- a transmission device for transmitting the second drive torque to the output element, and
- at least two signal transmitters, which are spaced apart from one another spatially, on a drive assembly which comprises the output element and the drive shaft, via which, during operation of the drive unit, two temporally successive measurement signals can be generated, the time interval of which varies depending on the level of the first and second drive torques.

A proposed control method then uses a control variable determined from the first and second measurement signals for controlling the at least one electric motor.

In this case, the control includes possible adjustment of the level of the second drive torque to be generated by the at least one electric motor.

Variants of a proposed control method can in particular be implemented using variants of a proposed drive unit. Therefore, features and advantages explained above and in the following in connection with variants of a proposed drive unit also apply for corresponding variants of a proposed control method, and vice versa.

In particular, in the context of a variant of a proposed control method, in addition at least one (measuring or motor) signal representative of the second drive torque and/or at least one stiffness value representative of the torsional stiffness of the drive assembly, the drive shaft and/or the drive element can be used for determining the control variable. In this case, the at least one stiffness value can for example be determined during a calibration of the drive unit (i.e., a calibration process carried out with the drive unit) and stored in a memory.

BRIEF DESCRIPTION OF THE DRAWINGS

The accompanying drawings illustrate, by way of example, possible variants of the proposed solution.

DETAILED DESCRIPTION

Figure 4:
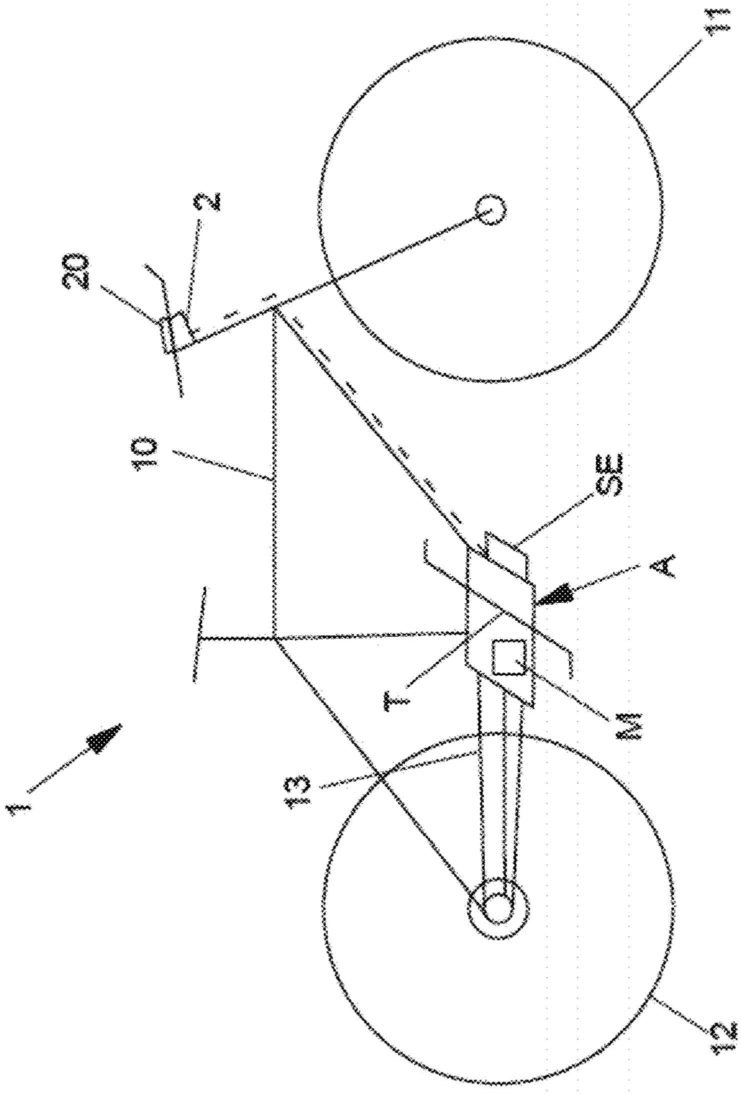
FIG. 4 shows an electric bicycle comprising a variant of a proposed drive unit.

FIG. 4 shows, by way of example, an electric bicycle 1 comprising a frame 10 on which a front wheel 11 and a back wheel 12 are rotatably mounted. The back wheel 12 can be driven in an electromotively assisted manner via a drive unit A. For this purpose, the drive unit A comprises at least one electric motor M. In this case, a drive torque generated by the electric motor M-optionally in addition to a drive torque applied by means of muscle force via a drive shaft/bottom bracket shaft T—can be transmitted to the back wheel 12 with the aid of a force transmission member, for example in the form of a chain or a belt. In this way, it is possible not only for a first drive torque, applied by a rider of the electric bicycle 1 via pedals connected to the bottom bracket shaft T, to be transmitted to the back wheel 12, but rather the back wheel 12 can also be driven via a second drive torque which is generated by the electric motor M.

In this case, a drive power applied by the electric motor M is specified via an electronic control unit SE of the drive unit A. Said electronic control unit SE specifies the drive power to be applied electromotively, by which the rider of the electric bicycle 1 is assisted when pushing the pedals, for example depending on assistance stages selected by the user. A corresponding assistance stage is then specified via an actuation unit 2 for example. In the case of the electric bicycle 1 of FIG. 4, said actuation unit 2 coupled to the control unit SE is provided on handlebars of the electric bicycle 1 and equipped with a display 20.

In contrast to designs hitherto conventional in practice, in the case of the drive unit A of the proposed solution a rotationally fixed coupling of an output element 4, connected to the force transmission member 13, to the bottom bracket shaft T is provided.

Figure 1:
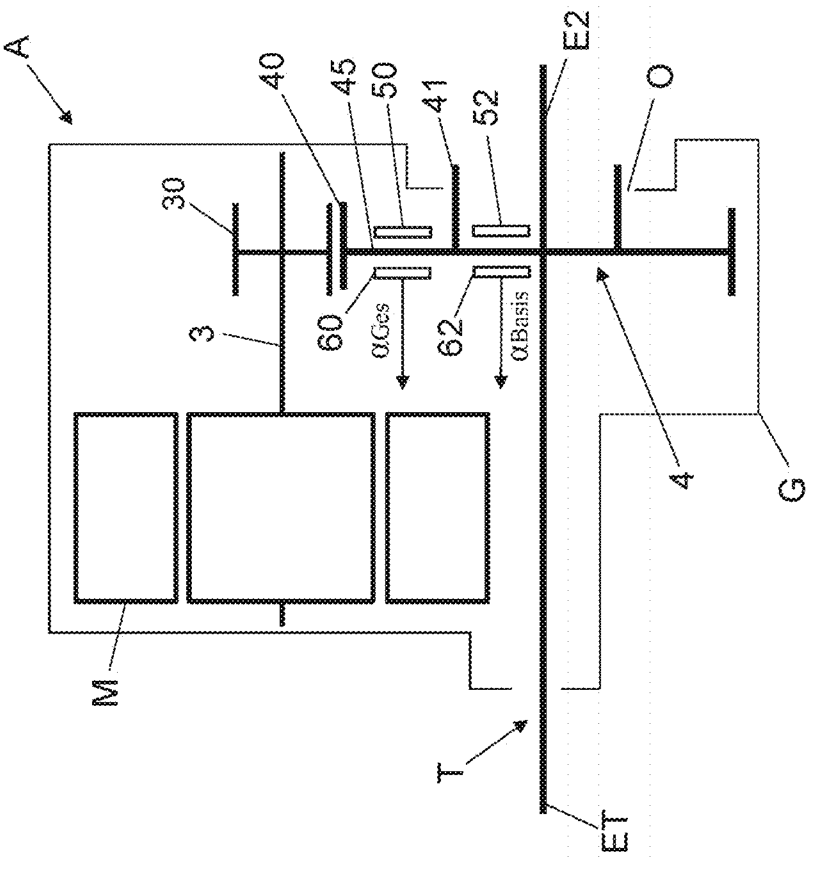
FIG. 1 is a schematic view of a first variant of a proposed drive unit for an electric bicycle, in which a drive shaft is formed integrally with an output element that integrates a transmission gear wheel and an output wheel and on which two signal transmitters, radially offset from one another, are provided for determining a first drive torque applied by means of muscle force (rider torque).

It is provided for this purpose, for example, in the case of a variant of FIG. 1, that the bottom bracket shaft T is formed integrally with the output element 4. In this case, the output element 4 is accommodated inside a housing G of the drive unit A, from which the bottom bracket shaft T protrudes on both sides, such that in each case a pedal can be connected to the bottom bracket shaft T at shaft ends E1, E2 protruding out of the housing G. The output element 4 furthermore forms an output wheel, for example in the form of an output pulley or, as shown in FIG. 1, in the form of an output gear wheel 41, to which the force transmission member 13 is connected. Furthermore, in the present case a transmission gear wheel 40 meshes, as part of a single-stage transmission device, with a drive gear wheel 30 which is connected to a rotor shaft 3 of the electric motor M in a rotationally fixed manner. Since the transmission gear wheel 40 is an integral component of the drive element 4, a (second) drive torque generated by the electric motor M can be introduced into the output element 4. Thus, an addition of a first drive torque applied by means of muscle force on the bottom bracket shaft T and of the second electromotively applied drive torque takes place at the output element 4, and an overall torque, resulting from this, is provided at the output gear wheel 41. In this case, the output gear wheel 41, to which the added drive torques are applied, is rotatably mounted in a housing opening O of the housing G.

On a web portion 45 of the output element 4, extending outwards in the radial direction with respect to the axis of rotation of the bottom bracket shaft T, two signal transmitters in the form of magnet elements 52 and 50 for Hall sensors 62, 60 of the drive unit A are provided, in a manner radially offset relative to one another. In the case of a rotation of the bottom bracket shaft T, and thus the output element 4 that is connected thereto in a rotationally fixed manner, the magnet elements 50 and 52 are moved past the Hall sensors 60 and 62, and in the process generate measurement signals which correlate with the rotational speed of the drive assembly defined with the bottom bracket shaft T and the output element 4, and thus constitute angle signals.

In the present case, one magnet element 52 is provided in the region of the bottom bracket shaft T, while the other magnet element 50 is positioned in the region of the transmission gear wheel 40. The corresponding positioning of the two magnet elements 52 and 50, and a correspondingly configured torsional stiffness of the drive assembly, makes it possible to observe, in the case of an integral configuration of the bottom bracket shaft T with the output element 4, that an elastic deformation occurs at the web portion 45, depending on the level of the drive torques and in particular the levels of the drive torques relative to one another. The elastic deformation results in a change of the spatial position of the magnet elements 52 and 50 relative to one another, which also has impacts on the measurement signals acquired upon rotation of the bottom bracket shaft T and the output element 4, which signals are generated by the magnet elements 52 and 50 on the Hall sensors 62 and 60. It can be observed that a time interval between the generated measurement signals varies depending on the level of the first and second drive torques relative to one another, in absolute or relative terms.

It is thereby then possible for example to take advantage of the fact that the torsional stiffness of the drive assembly is known, for example by interpretation and/or as a result of a previously performed calibration process with the drive unit A, and furthermore during operation of the drive unit A the second drive torque generated by the electric motor M at the rotor shaft 3 is also known. In this way, the first drive torque applied by means of muscle force, and therefore what is known as the rider torque, can be calculated from the occurrence or a change of a phase shift of the measuring or angle signals, respectively, generated at the Hall sensors 62 and 60. A control variable specified on the basis of this calculated drive torque can be provided to the electronic control unit SE, in order to control the assistance power to be applied by the electric motor M. In the present case, for this purpose measurement signals $\alpha_{Ges}$ and $\alpha_{Basis}$ generated by the Hall sensors are transmitted to the electronic control unit SE, which concludes the currently applied rider torque, and, from this in turn the control variable for controlling the electric motor M, via an integrated electronic evaluation logics.

The differential measurement with the aid of the time intervals between the measuring signals $\alpha_{Ges}$ and $\alpha_{Basis}$ of the Hall sensors 62 and 60, in order to conclude the rider torque, can be implemented in a comparatively cost-effective manner and using little installation space. In this case, the measurement is also possible without temperature-related fluctuations of the motor influences. Furthermore, on account of the radial spacing of the magnet elements 52 and 50, there is a comparatively high measuring resolution and thus a good level of precision.

Figure 2:
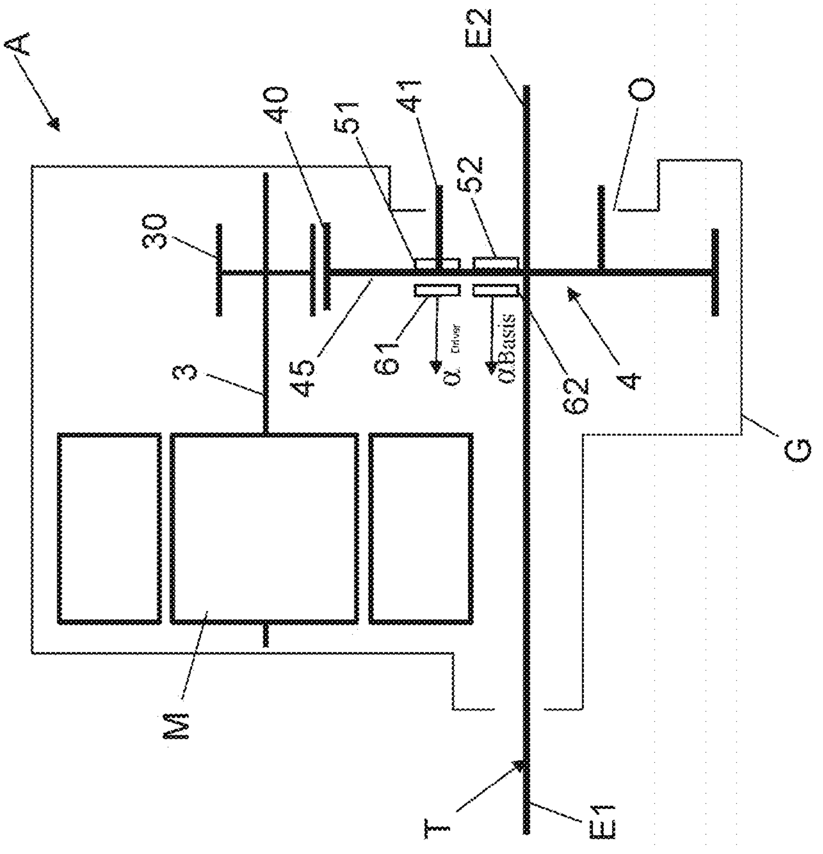
FIG. 2 shows a development of the variant of FIG. 1, in which the signal transmitters are positioned in a manner deviating from one another, on the output element.

In the variant of FIG. 2, a magnet element 51 located radially further outside is positioned in the region of the output gear wheel 41 and thus, in comparison with the magnet element 52 of FIG. 1, closer to the bottom bracket shaft T. In this case, the rider torque is determined from a differential measurement of measuring and angle signals $\alpha_{Driver}$ and $\alpha_{Basis}$, respectively, of Hall sensors 61 and 60. The corresponding measuring distance therefore consequently focusses more strongly on the influence of the applied rider torque. The smaller radial spacing furthermore leads to a reduced twisting of the magnet elements 52 and 51 than in the case of the magnet elements 52 and 50 of FIG. 1. Thus, for example in the case of a typical configuration of the drive unit A as a middle motor for the electric bicycle 1, a maximum deformation path in the form of a maximum twist angle can be up to ±5° in the variant of FIG. 1 and up to ±3° in the variant of FIG. 2.

Figure 3:
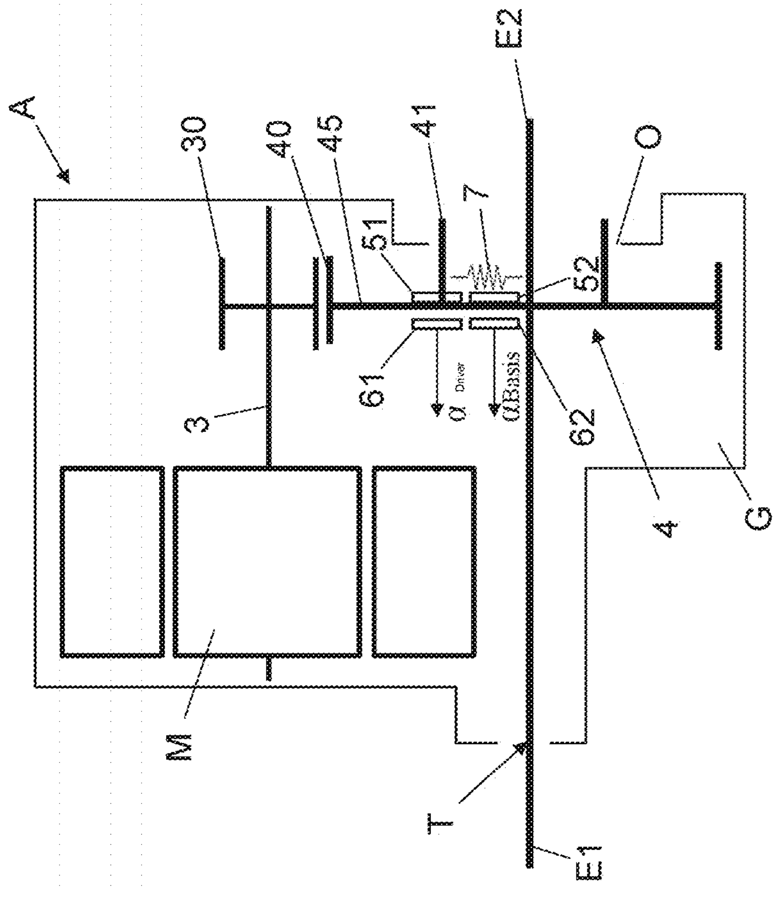
FIG. 3 shows a development of the variant of FIG. 2, in which at least one spring element is provided on the output element, in order to specify an elastic deformation during operation of the drive unit and, in conjunction with block mechanics, to limit it to a predefined level.

In the development of FIG. 3, the elasticity at the web portion 45 is increased by a spring element 7 in the force flow of the first drive torque, and furthermore limited by block mechanics and thus a mechanical rotation prevention to a maximum value. Thus, the spring element 7 predetermines, in a targeted manner, a predetermined elastic deformability of the output element 4 in the web portion 45, and thus a comparatively large degree of displaceability of the magnet element 51 assigned to the output gear wheel 41 (with respect to the axis of rotation of the bottom bracket shaft T) relative to the magnet element 52 assigned to the bottom bracket shaft T. In this case, the block mechanics on the web portion 45 ensures that an elastic deformability, predetermined by the at least one spring element 7, of the web portion 45 is limited to a predefined maximum deformation path. If a force applied by a rider of the electric bicycle 1, with which force the rider pushes the pedals attached at the shaft ends E1 and E2, exceeds a threshold value, and thus generates a first drive torque that is above a torque threshold value, the block mechanics ensures that the magnet element 51 (or, in an analogous development on the basis of the variant of FIG. 1, the magnet element 50) cannot displace beyond a maximum twist angle relative to the magnet element 52 assigned to the bottom bracket shaft T.

In this case, the elastic deformability predetermined via the spring element 7 (or further spring elements) then for example covers the normal operation of the drive unit A, in which a rider of the electric bicycle 1 does not push the pedals excessively hard. In the case of a sprint ride or test ride, in which the pedals are then pushed with a force exceeding a threshold value, no (measurable) change between the time intervals of the $\alpha_{Driver}$ and $\alpha_{Basis}$ ($\alpha_{Ges}$ and $\alpha_{Basis}$) occurs, and the calculated control variable for the control of the electric motor is thus set to a constant fixed value.

LIST OF REFERENCE SIGNS

1 electric bicycle
10 frame
11 front wheel
12 back wheel
13 force transmission member
2 actuation element
20 display
3 rotor shaft
30 drive gear wheel
4 output element
40 transmission gear wheel
41 output gear wheel
45 web portion
50, 51, 52 magnet element (signal transmitter)
60, 61, 62 Hall sensor
7 spring element
A drive unit
E1, E2 shaft end
G housing
M electric motor
O housing opening
SE electronic control unit
T bottom bracket shaft/drive shaft
$\alpha_{Ges}$, $\alpha_{Driver}$, $\alpha_{Basis}$ Measuring signal/angle signal

The invention claimed is:

1. A drive unit for an electric bicycle, comprising
an output element for providing a torque for driving the electric bicycle,
a drive shaft for generating a first drive torque by a rider of the electric bicycle by means of muscle force,
an electric motor for the generation by external force of a second drive torque at a rotor shaft coupled to the electric motor, and
a transmission device for transmitting the second drive torque to the output element, characterized in that
wherein the output element is connected in a rotationally fixed manner to the drive shaft and the drive unit has at least two signal transmitters, which are spaced apart from one another spatially, on a drive assembly which comprises the output element and the drive shaft, via which, during operation of the drive unit, two temporally successive measurement signals can be generated, the time interval of which varies depending on the level of the first and second drive torques.

2. The drive unit according to claim 1, wherein the at least two signal transmitters are arranged such that a change of the time interval between the measurement signals generated by the signal transmitters is representative of an elastic deformation at the drive assembly on account of the generated first and second drive torques.

3. The drive unit according to claim 1, wherein
a first signal transmitter of the at least two signal transmitters is provided at a first point a) on the drive shaft or b) at a region of the output element that is assigned to the drive shaft, and
a second signal transmitter of the at least two signal transmitters is provided at a second point a) at a region of the output element assigned to the transmission device or b) at a region of the output element that is assigned to an output wheel of the output element.

4. The drive unit according to claim 3, wherein the second point is located radially further outside compared with the first point, based on an axis of rotation of the drive shaft.

5. The drive unit according to claim 1, wherein the drive unit comprises at least one Hall sensor for generating at least one of the first and the second measurement signal.

6. The drive unit according to claim 1, wherein the drive unit comprises an electronic control unit which is configured to determine a control variable representative of the level of the first drive torque, using the first and second measurement signals and using a signal representative of the second drive torque.

7. The drive unit according to claim 6, wherein the electronic control unit is configured to use at least one stiffness value that is representative of the torsional stiffness of at least one of the drive assembly, the drive shaft and the output element, and is stored in a memory, for determining the control variable.

8. The drive unit according to claim 1, wherein the output element comprises at least one spring element which specifies an elastic deformability of the output element in at least one portion of the output element at which one of the signal transmitters is provided.

9. The drive unit according to claim 8, wherein the drive assembly comprises block mechanics which limits an elastic deformability, predetermined by the at least one spring element, of the at least one portion of the output element to a predefined maximum deformation path.

10. The drive unit according to claim 1, wherein the transmission device comprises at least one gear wheel which can be driven via the rotor shaft and which is provided for transmitting the second drive torque to the output element.

11. The drive unit according to claim 10, wherein the gear wheel is connected to the output element in a rotationally fixed manner.

12. The drive unit according to claim 11, wherein the gear wheel is formed on the output element.

13. The drive unit according to claim 12, wherein the gear wheel is formed on the output element integrally with the output wheel of the output element, which is provided for the transmission of the torque resulting from the first and second drive torques.

14. The drive unit according to claim 1, wherein a force transmission member is provided for transmitting the torque resulting from the first and second drive torques, which force transmission member is coupled to a back wheel of the electric bicycle, and the output element comprises an output wheel which is connected to the force transmission member for driving the electric bicycle using the torque resulting from the first and second drive torques.

15. The drive unit according to claim 1, wherein the drive unit comprises a housing in which the electric motor is received, and the drive shaft is rotatably mounted, and the output element is rotatably mounted at a housing opening of the housing.

16. The drive unit according to claim 13, characterized, wherein the drive unit comprises a housing in which the electric motor is received, and the drive shaft is rotatably mounted, and the output element is rotatably mounted at a housing opening of the housing, wherein the output wheel is rotatably mounted at the housing opening.

17. An electric bicycle comprising a drive unit according to claim 1.

18. A method for controlling at least one electric motor of a drive unit for an electric bicycle, wherein the drive unit comprises at least the following:

a drive shaft for generating a first drive torque by a rider of the electric bicycle by means of muscle force, an output element, connected to the drive shaft in a rotationally fixed manner, for providing a torque for driving the electric bicycle, the at least one electric motor for the generation by external force of a second drive torque at a rotor shaft coupled to the electric motor, a transmission device for transmitting the second drive torque to the output element, and at least two signal transmitters, which are spaced apart from one another spatially, on a drive assembly which comprises the output element and the drive shaft, via which, during operation of the drive unit, two temporally successive measurement signals can be generated, the time interval of which varies depending on the level of the first and second drive torques, and wherein a control variable determined from the first and second measurement signals is used for controlling the at least one electric motor.

19. The method according to claim 18, wherein in addition at least one of at least one stiffness value representative of the second drive torque and at least one stiffness value representative of the torsional stiffness of the drive assembly, at least one of the drive shaft and the drive element is used for determining the control variable.

20. The method according to claim 19, wherein the at least one stiffness value is determined and stored during a calibration of the drive unit.

* * * * *